United States Patent
Kindo (10) Patent No.: US 10,414,397 B2
(45) Date of Patent: Sep. 17, 2019

(54) OPERATIONAL DESIGN DOMAIN DECISION APPARATUS

(71) Applicant: TOYOTA JIDOSHA KABUSHIKI KAISHA, Toyota-shi, Aichi-ken (JP)

(72) Inventor: Toshiki Kindo, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/945,332

(22) Filed: Apr. 4, 2018

(65) Prior Publication Data

US 2018/0290652 A1  Oct. 11, 2018

(30) Foreign Application Priority Data

Apr. 6, 2017 (JP) ................................ 2017-076202

(51) Int. Cl.
  *B60W 30/16* (2012.01)
  *G05D 1/00* (2006.01)
  *G08G 1/00* (2006.01)

(52) U.S. Cl.
  CPC ........... *B60W 30/16* (2013.01); *G05D 1/0088* (2013.01); *G08G 1/00* (2013.01); *B60W 2550/10* (2013.01); *B60W 2750/308* (2013.01)

(58) Field of Classification Search
  CPC ............. B60W 30/16; B60W 2550/10; B60W 2750/308; G05D 1/0088
  USPC .......................................................... 701/23
  See application file for complete search history.

(56) References Cited

U.S. PATENT DOCUMENTS

2017/0341652 A1* 11/2017 Sugawara ............. B60W 50/14

FOREIGN PATENT DOCUMENTS

| CN | 104504902 A | * | 4/2015 |
| JP | 2001-199295 A | | 7/2001 |
| JP | 2008-150001 A | | 7/2008 |
| JP | 2016-126360 A | | 7/2016 |
| JP | 2016-200472 A | | 12/2016 |

\* cited by examiner

Primary Examiner — Isaac G Smith
(74) Attorney, Agent, or Firm — Sughrue Mion, PLLC

(57) ABSTRACT

An operational design domain decision apparatus includes: a position estimation unit configured to estimate a vehicle position; a traffic map database in which a restriction related to a vehicle speed and a position are associated with each other; a rule acquisition unit configured to acquire the restriction; a required value calculation unit configured to calculate a required detection distance at which it is necessary for an object detection sensor equipped in the vehicle to have detected a moving object for execution of a predetermined automatic driving; a distance measurement unit configured to calculate a detectable distance based on a detection result of the object detection sensor; and a determination unit configured to determine that the automatic driving system is in the operational design domain, when the detectable distance is equal to or more than the required detection distance.

8 Claims, 6 Drawing Sheets

OPERATIONAL DESIGN DOMAIN DECISION APPARATUS

INCORPORATION BY REFERENCE

The disclosure of Japanese Patent Application No. 2017-076202 filed on Apr. 6, 2017 including the specification, drawings and abstract is incorporated herein by reference in its entirety.

BACKGROUND

1. Technical Field

The disclosure relates to an operational design domain decision apparatus.

2. Description of Related Art

Japanese Patent Application Publication No. 2001-199295 (JP 2001-199295 A) discloses an apparatus that performs automatic driving of a vehicle. The apparatus calculates an automatic driving stability, based on a relation between a value indicating a detection state of a lane marking and the automatic driving stability and the current detection result of the lane marking. When the apparatus cannot detect the lane marking, the apparatus decides that the automatic driving stability is zero, that is, the automatic driving cannot be performed.

SUMMARY

The apparatus described in JP 2001-199295 A determines whether to execute an automatic driving for an automatic lane keeping of a vehicle, depending on whether the lane marking can be detected. Incidentally, the vehicle to execute the automatic driving is demanded to perform various operations such as follow-up traveling, overtaking and interruption, in addition to the lane keeping. Whether to execute such operations needs to be determined in consideration of an interrelation between the vehicle to execute the automatic driving and a moving object around the vehicle. Therefore, the apparatus described in JP 2001-199295 A, which determines whether to execute the automatic driving only based on the detection result of the lane marking, cannot appropriately determine whether to execute an automatic driving in which the moving object is considered, in some cases.

The disclosure provides an operational design domain decision apparatus that can appropriately determine an operational design domain of the automatic driving.

A first aspect of the disclosure provides an operational design domain decision apparatus. The operational design domain decision apparatus according to the first aspect includes: a traffic map database in which a restriction related to a vehicle speed and a position corresponding to the restriction are associated with each other, and an electronic control unit configured to: estimate a vehicle position of a vehicle; acquire the restriction, based on the vehicle position and the traffic map database; calculate, based on the restriction, a required detection distance at which it is necessary for object detection sensor equipped in the vehicle to have detected a moving object for execution of a predetermined automatic driving of the vehicle, the object detection sensor being configured to detect the moving object; calculate a detectable distance based on a detection result of the object detection sensor, the detectable distance being a distance within which the moving object is detectable by the object detection sensor; determine that an automatic driving system executing the predetermined automatic driving of the vehicle is in the operational design domain, when the detectable distance is equal to or more than the required detection distance; and execute the predetermined automatic driving based on a result of a decision whether the automatic driving system is in the operational design domain.

According to the configuration, from the traffic map database in which the restriction related to a vehicle speed and the position are associated with each other, the restriction related to the vehicle speed is acquired using the position of the vehicle. Then, based on the restriction related to the vehicle speed, the required detection distance is calculated. In this way, the apparatus can determine the required detection distance, on the premise that the moving object complies with the restriction related to the vehicle speed. Then, when the measured detectable distance is equal to or more than the required detection distance, it is determined that the automatic driving system is in the operational design domain. In this way, the apparatus can appropriately determine the operational design domain of the automatic driving, using the required detection distance and the measured result.

In the first aspect, the electronic control unit may be configured to calculate the required detection distance, by assuming that the vehicle and the moving object travel at a highest speed within the restriction.

According to the configuration, the apparatus can calculate the maximum of the required detection distance. Therefore, the apparatus can determine the operational design domain of the automatic driving, with the strictest condition.

In the first aspect, the electronic control unit may be configured to calculate, in a case where electronic control unit determines that the automatic driving system is not in the operational design domain, the required detection distance again after the electronic control unit changes an upper limit speed of the vehicle to a speed resulting from decreasing the upper limit speed by a predetermined value.

According to the configuration, the apparatus can change the required detection distance such that the required detection distance is decreased. Therefore, the apparatus can narrow and determine the operational design domain of the automatic driving, by changing the condition of the speed of the vehicle to a lower speed.

In the first aspect, the moving object may be an object traveling on a road on which the vehicle travels.

In the first aspect, the electronic control unit may be configured to calculate the required detection distance, by calculating, based on the restriction, a first traveling distance and a second traveling distance, the first traveling distance being a distance traveled by the vehicle for a predetermined time, the second traveling distance being a distance traveled by the moving object for the predetermined time.

A second aspect of the disclosure provides an operational design domain decision apparatus. The operational design domain decision apparatus according to the second aspect includes: a map database in which a required detection distance and a position corresponding to the required detection distance are associated with each other, the required detection distance being a distance at which it is necessary for an object detection sensor equipped in the vehicle to have detected a moving object for execution of a predetermined automatic driving of a vehicle, the object detection sensor being configured to detect the moving object, and an electronic control unit configured to: estimate a vehicle position of the vehicle; acquire the required detection distance based on the vehicle position and the map database; calculate a detectable distance based on a detection result of the object detection sensor, the detectable distance being a distance within which the moving object is detectable by the object detection sensor; determine that an automatic driving system executing the predetermined automatic driving of the vehicle is in the operational design domain, when the detectable distance is equal to or more than the required detection distance; and execute the predetermined automatic driving based on a result of a decision whether the automatic driving system is in the operational design domain.

According to the configuration, from the map database in which the required detection distance and the position are associated with each other, the required detection distance is acquired using the position of the vehicle. Then, when the measured detectable distance is equal to or more than the required detection distance, it is determined that the automatic driving system is in the operational design domain. In this way, the apparatus can appropriately determine the operational design domain of the automatic driving, using the required detection distance and the measured result.

In the second aspect, the moving object may be an object traveling on a road on which the vehicle travels.

According to various aspects of the disclosure, it is possible to appropriately determine the operational design domain of the automatic driving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, exemplary embodiments will be described with reference to the drawings. In the following description, identical reference characters are assigned to identical or equivalent elements, and repetitive descriptions will be omitted.

Technical Idea

An automatic driving system to automatically perform vehicle control has been developed mainly assuming that the vehicle travels on a motorway. This means that such an automatic driving system operates on the motorway. That is, the operational design domain (ODD) of the automatic driving system can be limited to the case where the vehicle travels on the motorway. Here, the operational design domain is a domain in which the automatic driving system operates as designed.

However, the operational design domain determined by road lanes is disappearing as the automatic driving system advances. Therefore, a new technique for determining the operational design domain of the automatic driving system is needed.

First Embodiment

Configuration of Automatic Driving System

Figure 1:
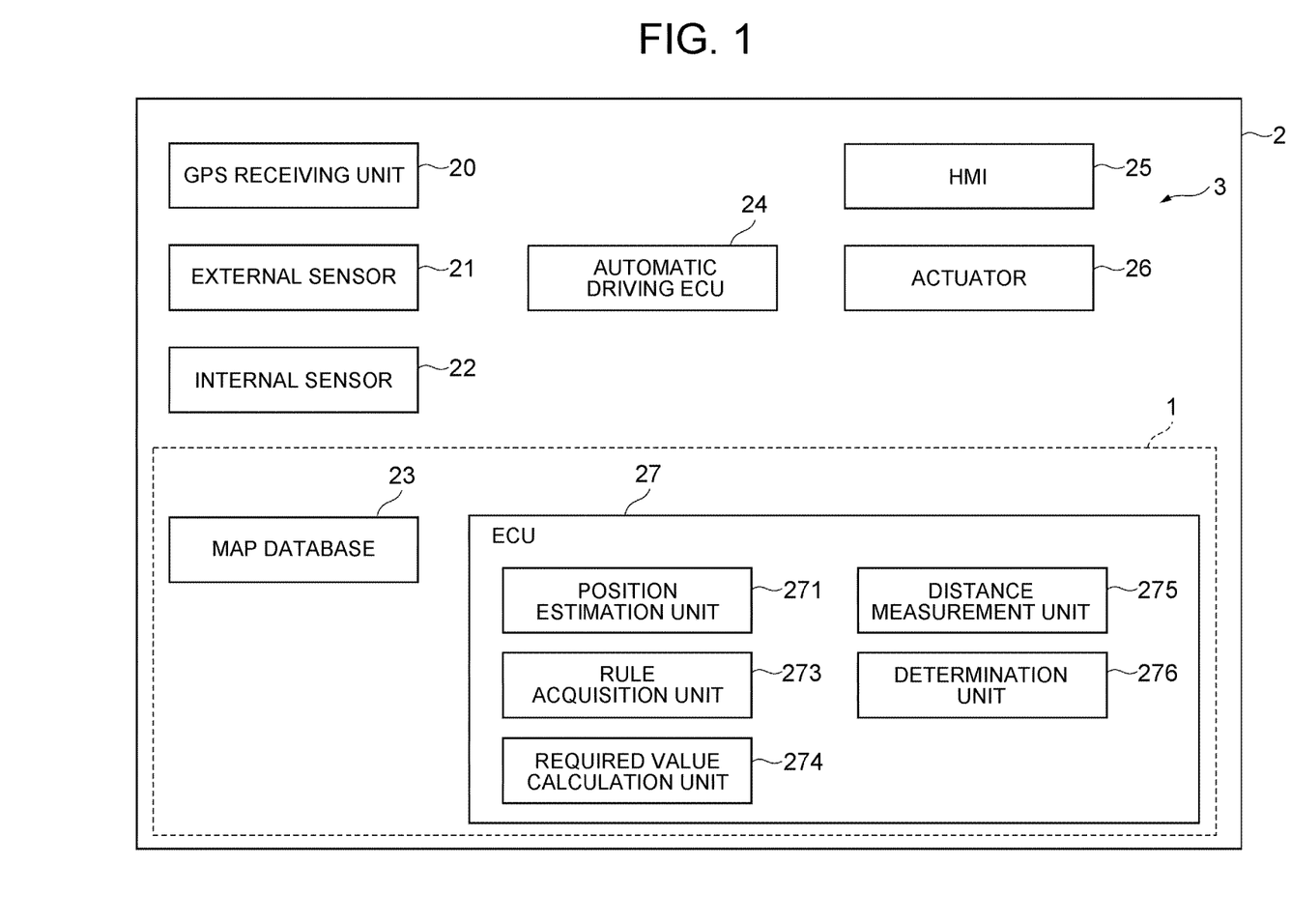
FIG. 1 is a block diagram showing an exemplary configuration of a vehicle including an operational design domain decision apparatus according to a first embodiment.

FIG. 1 is a block diagram showing an exemplary configuration of a vehicle 2 including an operational design domain decision apparatus 1 according to a first embodiment. As shown in FIG. 1, a vehicle 2 such as a passenger car is equipped with an automatic driving system 3. The operational design domain decision apparatus 1 constitutes a part of the automatic driving system 3.

The automatic driving system 3 executes an automatic driving of the vehicle 2. The automatic driving is a vehicle control of making the vehicle 2 automatically travel to a preset destination. The destination may be set by an occupant such as a driver, or may be automatically set by the automatic driving system 3. In the automatic driving, the driver does not need to perform driving operations, and the vehicle 2 automatically travels.

The automatic driving system 3 includes a GPS receiving unit 20, an external sensor 21 (an exemplary object detection sensor), an internal sensor 22, a map database 23 (an exemplary traffic map database), an automatic driving electronic control unit (automatic driving ECU) 24, a human machine interface (HMI) 25, an actuator 26, and an ECU 27. The ECU is an electronic control unit including a central processing unit (CPU), a read only memory (ROM), a random access memory (RAM), a controller area network (CAN) communication circuit, and the like.

The GPS receiving unit 20 measures the position of the vehicle 2 (for example, the latitude and longitude of the vehicle 2) by receiving signals from three or more GPS satellites.

The external sensor 21 is a detection device that detects a condition around the vehicle 2. The external sensor 21 includes at least one of a camera and a radar sensor. The camera is an imaging device that images an external condition of the vehicle 2. As an example, the camera is provided on the back side of a front windshield of the vehicle 2. The camera may be a monocular camera or may be a stereo camera. The stereo camera includes two imaging units that are disposed so as to reproduce a binocular parallax.

The radar sensor is a detection device that detects an object around the vehicle 2 using an electric wave (for example, a millimeter wave) or light. The radar sensor detects the object by sending the electric wave or light around the vehicle 2 and receiving the electric wave or light reflected by the object. As an example, the radar sensor includes at least one of a millimeter wave radar or a light detection and ranging (LIDAR).

The external sensor 21 may be prepared for each detection target. For example, the external sensor 21 may include a sensor for object detection and a dedicated sensor prepared for detecting a particular object. As an example, the dedicated sensor is a camera for detecting a traffic light. In this case, the traffic light and the signal state are detected by a template matching using the color information (for example, luminance) of an image acquired by the camera and/or the shape (for example, use of Hough transform) of the image. For enhancing the detection accuracy for the traffic light, map information described later may be used.

The internal sensor 22 is a detection device that detects a traveling state of the vehicle 2. The internal sensor 22 includes a speed sensor, an acceleration sensor, and a yaw rate sensor. The speed sensor is a detector that detects the speed of the vehicle 2. As the speed sensor, for example, there is used a wheel speed sensor that is provided on a wheel of the vehicle 2, a drive shaft to rotate integrally with the wheel, or the like, and that detects the rotational speed of the wheel.

The acceleration sensor is a detector that detects the acceleration of the vehicle 2. The acceleration sensor may include a front-back acceleration sensor that detects the acceleration of the vehicle 2 in the front-back direction of the vehicle 2, and a lateral acceleration sensor that detects the lateral acceleration of the vehicle 2. The yaw rate sensor is a detector that detects the yaw rate (turning angle velocity) of the center of gravity of the vehicle 2 around the vertical axis of the vehicle 2. As the yaw rate sensor, for example, a gyro sensor can be used.

The map database 23 is a storage device that stores map information. For example, the map database 23 is provided in a hard disk drive (HDD) equipped in the vehicle 2. The map database 23 can include a plurality of maps as the map information.

An example of the map is a traffic rule map. The traffic rule map is a three-dimensional database in which the traffic rule and the positional information on the map are associated with each other. The traffic rule map includes positions of lanes and connection forms of lanes, and the traffic rule is associated with each lane. The traffic rule includes a restriction related to a vehicle speed. That is, the traffic rule map is a database in which the restriction related to the vehicle speed and the position are associated with each other. The restriction related to the vehicle speed includes a limiting speed. The restriction related to the vehicle speed may include a standard acceleration at which the vehicle 2 reaches the limiting speed, a standard acceleration at which the vehicle 2 stops, and the like. The traffic rule may include other general rules such as preference road, stop, no entry and one-way traffic.

The map information may include a map that includes an output signal of the external sensor 21, for using a simultaneous localization and mapping (SLAM) technology. An example of the map is a localization knowledge that is used in the position recognition for the vehicle 2. The localization knowledge is three-dimensional data in which characteristic points and position coordinates are associated with each other. The characteristic points include a point having a high reflectance in the detection result of the LIDAR or the like, a structure having a shape that causes a characteristic edge (for example, an external shape of a sign, a pole or a curbstone), and the like.

The map information may include a background knowledge. The background knowledge is a map expressing, by voxel, a three-dimensional object existing as an object (stationary object) that stops without changing the position on the map.

The map information may include a traffic light location that is three-dimensional position data of the traffic light. The map information may include a surface knowledge that is ground data about ground level and the like. The map information may include a trajectory knowledge that is data expressing a preferable traveling trajectory defined on the road.

Some of the map information included in the map database 23 may be stored in a storage device different from the HDD in which the map database 23 is stored. Some or all of the map information included in the map database 23 may be stored in a storage device other than the storage device equipped in the vehicle 2. The map information may be two-dimensional information.

The HMI 25 is an interface for inputting and outputting information between the automatic driving system 3 and the occupant. As an example, the HMI 25 includes a display, a speaker, and the like. The HMI 25 performs an image output on the display and a voice output from the speaker, in response to a control signal from the automatic driving ECU 24. The display may be a head-up display. As an example, the HMI 25 includes input devices (a button, a touch panel, a voice inputter and the like) for accepting an input from the occupant.

The actuator 26 is a device that is used for the control of the vehicle 2. The actuator 26 includes at least a throttle actuator, a brake actuator, and a steering actuator.

The throttle actuator controls driving power of the vehicle 2 by controlling the supply amount of air to an engine (throttle opening degree), in response to a control signal from the automatic driving ECU 24. In the case where the vehicle 2 is a hybrid vehicle, in addition to the supply amount of air to the engine, a control signal from the automatic driving ECU 24 is input to a motor as a dynamic power source, so that the driving power of the vehicle 2 is controlled. In the case where the vehicle 2 is an electric vehicle, a control signal from the automatic driving ECU 24 is input to a motor as a dynamic power source, instead of the throttle actuator, so that the driving power of the vehicle 2 is controlled. In these cases, the motors as dynamic power sources constitute the actuator 26.

The brake actuator controls a brake system and controls braking power that is given to wheels of the vehicle 2, in response to a control signal from the automatic driving ECU 24. As the brake system, for example, a hydraulic brake system can be used.

The steering actuator controls the drive of an assist motor of an electric power steering system that controls steering torque, in response to a control signal from the automatic driving ECU 24. Thereby, the steering actuator controls the steering torque of the vehicle 2.

The automatic driving ECU 24 is a kind of hardware that integrally manages the automatic driving system 3, and is a computing device. For example, the automatic driving ECU 24 is connected to a network for a communication with use of the CAN communication circuit, and is connected such that the automatic driving ECU 24 can communicate with the above-described constituent elements of the vehicle 2. That is, the automatic driving ECU 24 can refer to the measured result of the GPS receiving unit 20, the detection result of the external sensor 21, the detection result of the internal sensor 22, and the map information of the map database 23. The automatic driving ECU 24 can refer to information input to the HMI 25. The automatic driving ECU 24 can output signals to the HMI 25 and the actuator 26.

For example, the automatic driving ECU 24 loads programs stored in the ROM, into the RAM, and the CPU executes the programs loaded in the RAM, so that each function for the automatic driving described later is realized. The automatic driving ECU 24 may be constituted by a plurality of ECUs.

The automatic driving ECU 24 recognizes the position of the vehicle 2 on the map, based on the positional information of the vehicle 2 received by the GPS receiving unit 20 and the map information of the map database 23 (vehicle position estimation: localization). Further, the automatic driving ECU 24 recognizes the position of the vehicle 2 by the SLAM technology, using the localization knowledge of the map database 23 and the detection result of the external sensor 21. The automatic driving ECU 24 may recognize the position of the vehicle 2 on the map, by another well-known technique. In the case where the position of the vehicle 2 can be measured by a sensor that is provided in an exterior such as a road, the automatic driving ECU 24 may recognize the position of the vehicle 2 through the communication with the sensor.

As an example, the automatic driving ECU 24 recognizes the object around the vehicle 2 (including the position of the object), based on the detection result of the external sensor 21 and the map information (data about traffic environment) of the map database 23. In the case where the map information includes the surface knowledge, the automatic driving ECU 24 detects the object based on level difference from the ground. The automatic driving ECU 24 may apply a ground estimation model to the detection result of the external sensor 21, to detect the object based on the level difference from the ground. The automatic driving ECU 24 may recognize the object by another well-known technique.

The object includes moving objects such as a pedestrian, a bicycle and another vehicle, in addition to stationary objects such as a utility pole, a guardrail, a tree and a building. For example, the moving object may be an object moving on a road on which the vehicle 2 is currently traveling or is to travel from now. For example, the automatic driving ECU 24 recognizes the object whenever the automatic driving ECU 24 acquires the detection result from the external sensor 21.

As an example, the automatic driving ECU 24 detects a moving object from the recognized objects, using the background knowledge. The automatic driving ECU 24 may detect the moving object by another well-known technique.

The automatic driving ECU 24 applies a Kalman filter, a particle filter or the like to the detected moving object, and detects the movement amount of the moving object at the time point. The movement amount includes the moving direction and moving speed of the moving object. The movement amount may include the rotational speed of the moving object. Further, the automatic driving ECU 24 may estimate the error of the movement amount.

The automatic driving ECU 24 may specify the kind of the moving object, by an image recognition process (a comparison process with an image model of the object) of the camera, or the like. In the case where the kind of the moving object can be specified, the automatic driving ECU 24 corrects the movement amount of the moving object and the error of the movement, based on the kind of the moving object.

The moving object may include a parked vehicle, a stationary pedestrian and the like, or may exclude them. The moving direction of another vehicle having a speed of zero can be estimated, for example, by detecting the front face of the vehicle with an image process of the camera. Similarly, the moving direction of a stationary pedestrian can be estimated by detecting the orientation of the face.

The automatic driving ECU 24 recognizes a traveling state of the vehicle 2, based on the detection result of the internal sensor 22 (for example, the vehicle speed information of the speed sensor, the acceleration information of the acceleration sensor, the yaw rate information of the yaw rate sensor, and the like). For example, the traveling state of the vehicle 2 includes the vehicle speed, the acceleration, and the yaw rate.

The automatic driving ECU 24 recognizes a marking of a lane on which the vehicle 2 travels based on the detection result of the external sensor 21.

The automatic driving ECU 24 generates a course of the vehicle 2, based on the detection result of the external sensor 21, the map information of the map database 23, the position of the vehicle 2 on the map recognized by the automatic driving ECU 24, the information of the object (including the marking) recognized by the automatic driving ECU 24, and the traveling state of the vehicle 2 recognized by the automatic driving ECU 24. At this time, the automatic driving ECU 24 generates the course of the vehicle 2, assuming the behavior of the object around the vehicle 2. Examples of the assumption of the behavior of the object include an assumption that all objects around the vehicle 2 are stationary objects, an assumption that the moving object moves independently, and an assumption that the moving object moves while interacting with at least one of another object and the vehicle 2.

The automatic driving ECU 24 generates a plurality of course candidates of the vehicle 2 using a plurality of assumptions. At least one of the course candidates is a course on which the vehicle 2 travels while avoiding the object. The automatic driving ECU 24 selects one course using the respective reliabilities of the course candidates and the like.

The automatic driving ECU 24 generates a traveling plan corresponding to the selected course. The automatic driving ECU 24 generates the traveling plan corresponding to the course of the vehicle 2, based on the detection result of the external sensor 21 and the map information of the map database 23.

The automatic driving ECU 24 outputs the generated traveling plan, such that the course of the vehicle 2 is expressed as a plurality of combinations each of which has two elements of a target position p in a coordinate system fixed to the vehicle 2 and a velocity V at a target point, that is, a plurality of configuration coordinates (p,V). Here, each target position p includes at least a position on the x-coordinate and a position on the y-coordinate in the coordinate system fixed to the vehicle 2, or information equivalent to the positions. The traveling plan is not particularly limited, if the traveling plan indicates the behavior of the vehicle 2. In the traveling plan, for example, a target time t may be used instead of the velocity V, and the target time t and the orientation of the vehicle 2 at the time point may be added. The traveling plan may be data indicating shifts of the vehicle speed, acceleration, steering torque and others of the vehicle 2 when the vehicle 2 travels on the course. The traveling plan may include a speed pattern, acceleration pattern and steering pattern of the vehicle 2. Here, the automatic driving ECU 24 may generate the traveling plan such that a traveling time (a time required for the vehicle 2 to reach the destination) is minimized.

The automatic driving ECU 24 controls the automatic traveling of the vehicle 2, based on the generated traveling plan. The automatic driving ECU 24 outputs a control signal corresponding to the traveling plan, to the actuator 26. Thereby, the automatic driving ECU 24 controls the traveling of the vehicle 2 such that the vehicle 2 automatically travels in accordance with the traveling plan. The automatic driving ECU 24 can execute the automatic driving of the vehicle 2 by a well-known technique.

Configuration of Operational Design Domain Decision Apparatus

The operational design domain decision apparatus 1 includes the above-described map database 23 and the ECU 27. The operational design domain decision apparatus 1 determines the operational design domain of the automatic driving system 3 that performs the automatic driving of the vehicle 2. The ECU 27 is a main hardware device of the operational design domain decision apparatus 1, and is a computing device. For example, the ECU 27 is connected to the network for the communication with use of the CAN communication circuit, and is connected such that the ECU 27 can communicate with the map database 23. That is, the ECU 27 can refer to the map information of the map database 23. The ECU 27 can refer to information input to the HMI 25. The ECU 27 can output signals to the HMI 25. The ECU 27 may be connected to other constituent elements of the vehicle 2. The ECU 27 may be included in the automatic driving ECU 24.

The ECU 27 includes a position estimation unit 271, a rule acquisition unit 273, a required value calculation unit 274, a distance measurement unit 275, and a determination unit 276.

The position estimation unit 271 estimates the position of the vehicle 2. The position estimation unit 271 estimates the position of the vehicle 2 by the same technique as the vehicle position estimation of the automatic driving ECU 24. The position estimation unit 271 may acquire the position of the vehicle 2 estimated by the automatic driving ECU 24. For example, the position estimation unit 271 estimates the position in a predetermined cycle.

The rule acquisition unit 273 acquires a traffic rule at the position of the vehicle 2 estimated by the position estimation unit 271. More specifically, the rule acquisition unit 273 acquires a restriction related to the vehicle speed based on the position of the vehicle 2 estimated by the position estimation unit 271 and the traffic rule map of the map database 23. As an example, the rule acquisition unit 273 refers to the traffic rule map of the map database 23, and acquires a limiting speed on a lane corresponding to the position of the vehicle 2 estimated by the position estimation unit 271. The rule acquisition unit 273 may further acquire a standard acceleration at which the vehicle 2 reaches the limiting speed, a standard acceleration at which the vehicle 2 stops, and the like. For example, the rule acquisition unit 273 acquires the traffic rule at the position of the vehicle 2, in a predetermined cycle or whenever the position of the vehicle 2 is estimated by the position estimation unit 271.

Based on the restriction related to the vehicle speed acquired by the rule acquisition unit 273, the required value calculation unit 274 calculates a required detection distance that is a distance at which it is necessary for the moving object to have been detected for the execution of a previously determined automatic driving. The previously determined automatic driving is an automatic driving that satisfies a driving policy determined in design phase. The required detection distance is a distance at which it is necessary for the moving object to have been detected by the external sensor 21 or the like, on the premise that the previously determined automatic driving is appropriately satisfied. In other words, the required detection distance is a detection distance of the external sensor 21 that is required for appropriately realizing the automatic driving.

For appropriately executing the previously determined automatic driving, it is necessary to detect the moving object around the vehicle 2 in advance. As the detection of the moving object is delayed, adoptable choices for the automatic driving system 3 tend to be reduced. Accordingly, for appropriately executing the previously determined automatic driving, there is a limit of the detection timing (or detection distance) for the moving object. The required detection distance is this limit. As the approach speed between the vehicle 2 and the moving object is higher, the influence of the moving object on the vehicle 2 is greater, and therefore, it is necessary to detect the moving object earlier. That is, the required detection distance is influenced by the speed of the vehicle 2 and the speed of the moving object.

For calculating the required detection distance, the required value calculation unit 274 employs a model of "the vehicle 2 and the moving object comply with traffic rules such as the traveling within the lane". That is, the required value calculation unit 274 predicts the actions of the vehicle 2 and moving object, using the restriction related to the vehicle speed acquired by the rule acquisition unit 273. Then, the required value calculation unit 274 calculates the required detection distance based on the predicted actions. That is, a range in which the required detection distance can be calculated is a range in which the traffic rule map of the map database 23 is prepared.

The required value calculation unit 274 may calculate the required detection distance, assuming that the vehicle 2 and the moving object travel at the highest speed in the restriction related to the vehicle speed acquired by the rule acquisition unit 273. That is, the required value calculation unit 274 may assume, "the vehicle 2 and the moving object operate such that the speed efficiencies are maximized, while complying with traffic rules".

Figure 2:
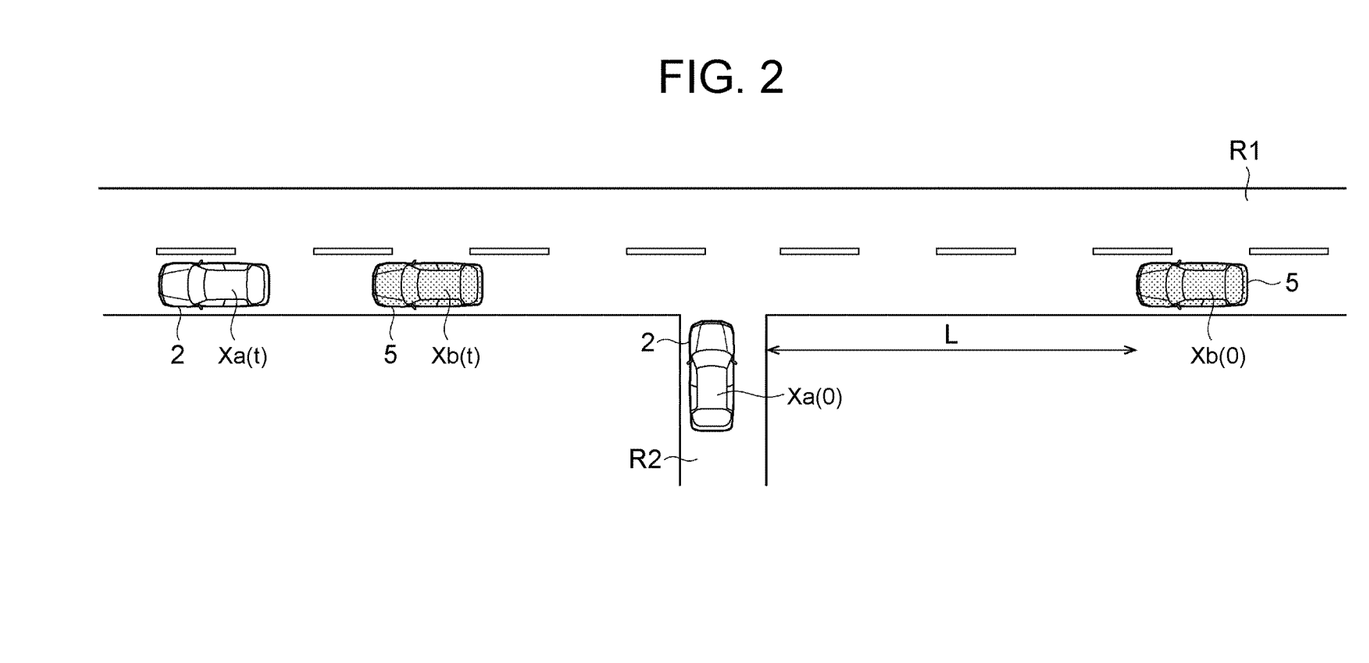
FIG. 2 is a diagram for describing an exemplary required distance calculation process.

As exemplified below, the required detection distance can be calculated when there is a traffic rule map. FIG. 2 is a diagram for describing an exemplary required distance calculation process. FIG. 2 exemplifies a road environment in which a non-preference road R2 is connected to a preference road R1. The vehicle 2 travels on the non-preference road R2, and another vehicle 5, which is a moving object, travels on the preference road R1. The vehicle 2 enters the preference road R1 from the non-preference road R2. At an entry starting time (t=0), the vehicle 2 is positioned at $x_a(0)$, and the other vehicle 5 is positioned at $x_b(0)$. At t=0, the speed of the vehicle 2 is 0 km/h. Based on the model of "the vehicle 2 and the moving object comply with traffic rules such as the traveling within the lane", it can be assumed that the speed of the other vehicle 5 at t=0 is a limiting speed v for the preference road R1. The vehicle 2 also travels while complying with traffic rules (limiting speeds on the preference road R1 and the non-preference road R2). The traffic rules may include a standard acceleration at which the vehicle 2 reaches the limiting speed, and the like.

The time after the vehicle 2 enters the preference road R1 and before the vehicle 2 reaches the limiting speed while complying with traffic rules is indicated as t, and the position when the vehicle 2 reaches the limiting speed is indicated as $x_a(t)$. On this occasion, when the following expression is satisfied, the automatic driving cannot be appropriately realized unless the other vehicle 5 decelerates.

$$|x_b(0)-x_a(t)|<v \cdot t \qquad \text{[Expression 1]}$$

In order that the vehicle 2 enters the preference road R1 without expecting that the other vehicle 5 decelerates, it is necessary to detect the absence of the other vehicle 5 satisfying the following condition, at the time point when it is determined that the vehicle 2 enters the preference road R1.

$$L=x_b(0)-x_a(0) \qquad \text{[Expression 2]}$$

$$L < x_a(t) - x_a(0) + v \cdot t \qquad (1)$$

The right side of Expression (1) is the lower limit (required detection distance) of the detection distance of the external sensor 21 that is necessary for appropriately realizing the automatic driving. The required value calculation unit 274 can perform the above calculation for an arbitrary position on the traffic rule map. Therefore, the required value calculation unit 274 can create a map with the required detection distance for appropriately realizing the automatic driving. Hereinafter, the map is referred to as a required detection distance map (Expected Sensing Capability Map).

The required detection distance map is a database in which the position and the required detection distance are associated with each other. A domain of the required detection distance map is included in a domain of the traffic rule map. When the domain of the required detection distance map coincides with the domain of the traffic rule map, the domain of the required detection distance map is maximized. The maximized domain of the required detection distance map is an upper limit operational design domain of the automatic driving system.

The required value calculation unit 274 may add a correction value set in consideration of the error, to the limiting speed v of the other vehicle 5. The required value calculation unit 274 may correct the right side of the Expression (1), in consideration of computing time of the automatic driving system 3.

The required value calculation unit 274 may consider a case where the speed of the other vehicle 5 is zero although the other vehicle 5 was a moving object. In this case, the calculation described with use of FIG. 2 is performed while the speed of the other vehicle 5 is set to zero and the speed of the vehicle 2 is set to the limiting speed v, and thereby, another required detection distance can be calculated. As the required detection distance, the required value calculation unit 274 may employ a longer distance of the two calculated required detection distances. The required value calculation unit 274 may calculate a required detection region by calculating the required detection distance over the detection range of the external sensor 21 of the vehicle 2.

The distance measurement unit 275 calculates a detectable distance based on the detection result of the external sensor 21 of the vehicle 2. For example, the distance measurement unit 275 calculates the detectable distance based on a characteristic point that is of the characteristic points detected by the external sensor 21 and that is most distant from the vehicle 2.

The determination unit 276 determines that the automatic driving system 3 is in the operational design domain, when the detectable distance is equal to or more than the required detection distance. When the above comparison condition is satisfied, it can be said that the vehicle 2 is able to detect the distance at which it is necessary for the moving object to have been detected for the execution of the previously determined automatic driving. Therefore, when the detectable distance is equal to or more than the required detection distance, the determination unit 276 determines that the automatic driving system 3 is in the operational design domain. That is, the determination unit 276 determines that the automatic driving system 3 appropriately operates the automatic driving as designed. On the other hand, when the above comparison condition is not satisfied, it can be said that the vehicle 2 is unable to detect the distance at which it is necessary for the moving object to have been detected for the execution of the previously determined automatic driving. Therefore, when the detectable distance is less than the required detection distance, the determination unit 276 determines that the automatic driving system 3 is out of the operational design domain.

In this way, for each position of the vehicle 2, the operational design domain decision apparatus 1 determines whether the automatic driving system 3 is in the operational design domain.

When the determination unit 276 determines that the automatic driving system 3 is not in the operational design domain, the required value calculation unit 274 may calculate the required detection distance again after the upper limit speed of the vehicle 2 is changed to a speed resulting from decreasing the upper limit speed by a predetermined speed. As described above, the required value calculation unit 274 calculates the required detection distance, on the premise that the upper limit speed of the vehicle 2 coincides with the limiting speed. On this occasion, the calculated required detection distance is the longest distance. The required value calculation unit 274 can change the required detection distance to a shorter distance, by setting the upper limit speed of the vehicle 2 again such that the upper limit speed is decreased by the predetermined speed. Therefore, when the detectable distance is less than the required detection distance, the required value calculation unit 274 can search a range in which the detectable distance is equal to or more than the required detection distance, by a recalculation in which the upper limit speed of the vehicle 2 is adopted as a parameter.

The operational design domain decision apparatus 1 may output the operational design domain of the automatic driving system 3, to the automatic driving ECU 24. The automatic driving ECU 24 may continue the automatic driving of the vehicle 2 when the automatic driving system 3 is in the operational design domain, and may end the automatic driving of the vehicle 2 when the automatic driving system 3 is not in the operational design domain. The automatic driving ECU 24 may make the HMI 25 perform a display about the end of the automatic driving.

Operation of Operational Design Domain Decision Apparatus

Figure 3:
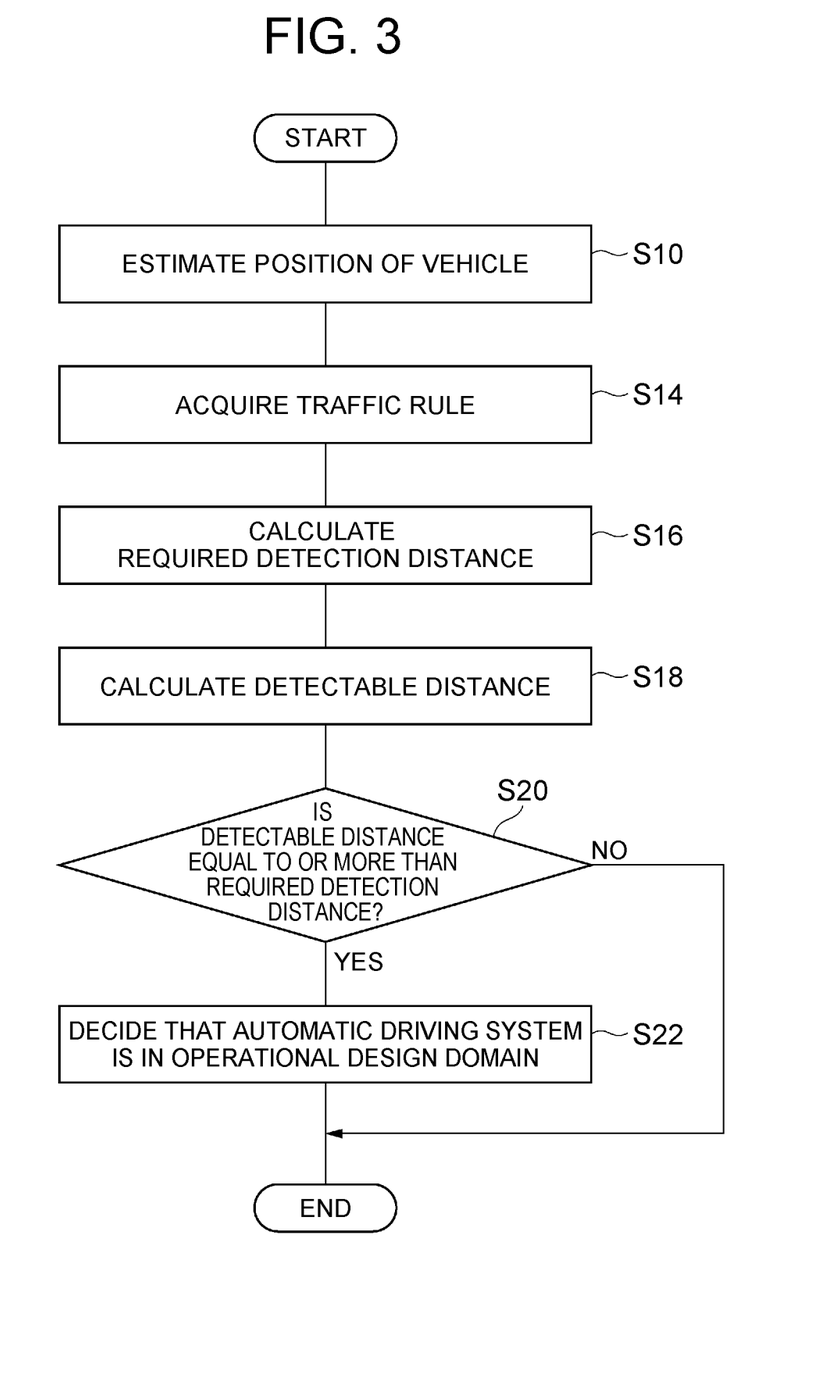
FIG. 3 is a flowchart showing an exemplary operational design domain decision process.

In the following, an exemplary operational design domain decision method will be disclosed. FIG. 3 is a flowchart showing an exemplary operational design domain decision process. The flowchart in FIG. 3 is executed by the operational design domain decision apparatus 1, for example, at the timing when an ON operation of an operational design domain decision function by the driver of the vehicle 2 is accepted.

As shown in FIG. 3, the position estimation unit 271 of the operational design domain decision apparatus 1 estimates the position of the vehicle 2, as a position estimation process (S10). As an example, the position estimation unit 271 recognizes the position of the vehicle 2 on the map, based on the positional information of the vehicle 2 received by the GPS receiving unit 20 and the map information of the map database 23 (vehicle position estimation: localization). When the automatic driving functions, the position estimation unit 271 may acquire the position of the vehicle 2 estimated by the automatic driving ECU 24.

Subsequently, as a traffic rule acquisition process (S14), the rule acquisition unit 273 of the operational design domain decision apparatus 1 acquires the limiting speed on the lane corresponding to the position of the vehicle 2, based on the position of the vehicle 2 estimated in the position estimation process (S10) and the traffic rule map of the map database 23. The rule acquisition unit 273 may further acquire the standard acceleration at which the vehicle 2 reaches the limiting speed, the standard acceleration at which the vehicle 2 stops, and the like.

Subsequently, as a required detection distance calculation process (S16), the required value calculation unit 274 of the operational design domain decision apparatus 1 calculates the required detection distance, based on the limiting speed acquired in the traffic rule acquisition process (S14) and the like. The required value calculation unit 274 calculates the required detection distance, by setting the upper limit speed of the vehicle 2 and the moving object based on the model of "the vehicle 2 and the moving object comply with traffic rules such as the traveling within the lane". The required value calculation unit 274 calculates the required detection distance, for example, using the above-described Expression (1).

Subsequently, as a detectable distance calculation process (S18), the distance measurement unit 275 of the operational design domain decision apparatus 1 calculates the detectable distance, for example, based on the characteristic point that is of the characteristic points detected by the external sensor 21 and that is most distant from the vehicle 2.

Subsequently, as a determination process (S20), the determination unit 276 of the operational design domain decision apparatus 1 determines whether the detectable distance is equal to or more than the required detection distance. When the determination unit 276 determines that the detectable distance is equal to or more than the required detection distance (S20: YES), the determination unit 276 determines that the automatic driving system 3 is in the operational design domain, as a decision process (S22).

When the determination unit 276 determines that the detectable distance is less than the required detection distance (S20: NO) or when the decision process (S22) ends, the operational design domain decision apparatus 1 ends the flowchart shown in FIG. 3. For example, the operational design domain decision apparatus 1 executes the flowchart shown in FIG. 3 from the start, when an OFF operation of the operational design domain function by the driver of the vehicle 2 is not accepted.

Even when the determination unit 276 of the operational design domain decision apparatus 1 determines that the automatic driving system 3 is out of the operational design domain, the determination unit 276 of the operational design domain decision apparatus 1 can determine that that the automatic driving system 3 is in the operational design domain, in some cases, by decreasing the upper limit speed of the vehicle 2. For example, there is a case where the detectable distance is decreased by a fog or the like when the vehicle 2 is traveling on a single road of a motorway or the like. In this case, if the upper limit speed of the vehicle 2 remains set to the limiting speed, the determination unit 276 of the operational design domain decision apparatus 1, due to the decrease in detectable distance, can determine that the automatic driving system 3 is out of the operational design domain. In such a case, the upper limit speed of the vehicle 2 is decreased, and thereby, the required detection distance is decreased, allowing the automatic driving system 3 to be in the operational design domain again.

Figure 4:
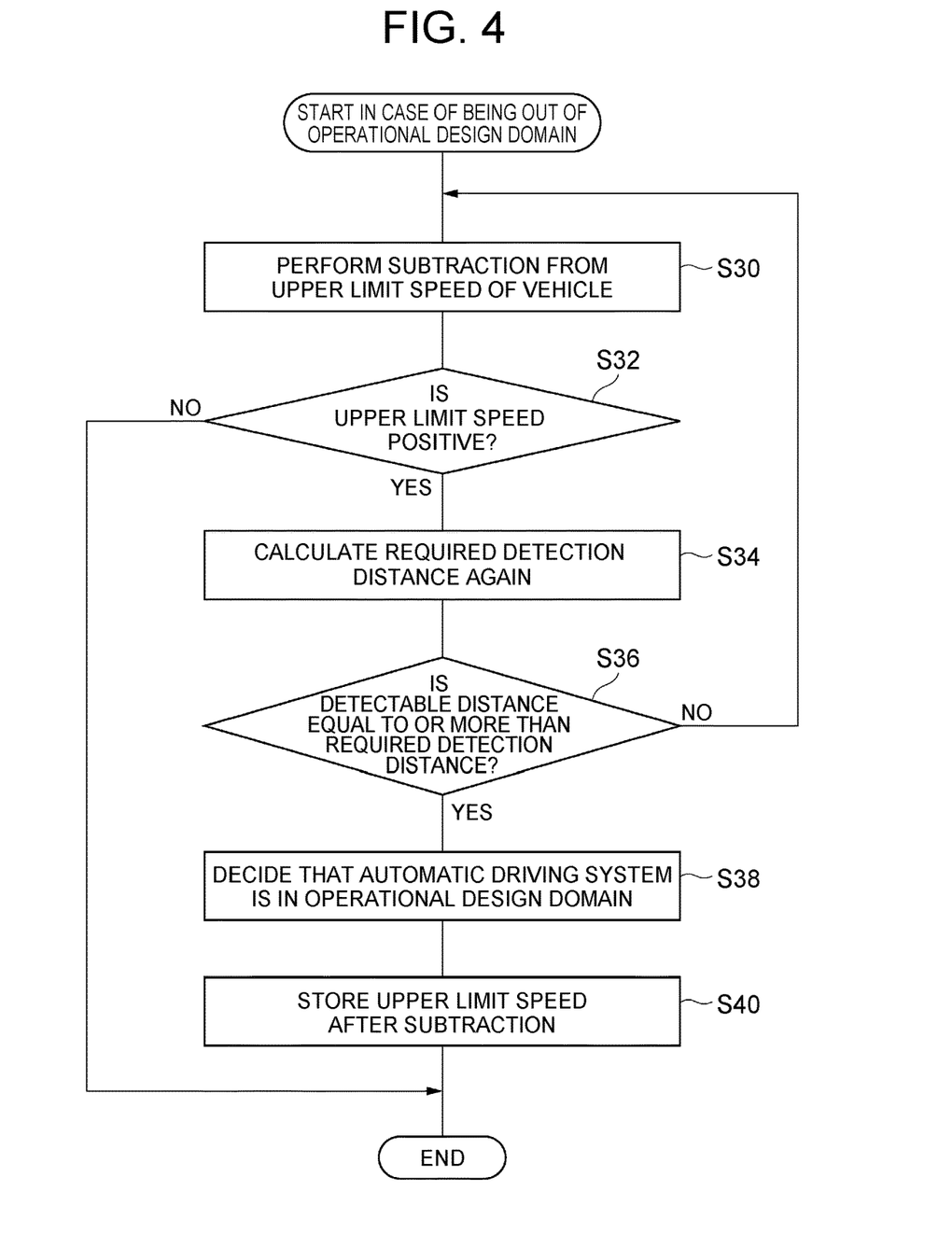
FIG. 4 is a flowchart showing an exemplary operational design domain decision process in the case of being out of the operational design domain.

FIG. 4 is a flowchart showing an exemplary operational design domain decision process in the case of being out of the operational design domain. The flowchart in FIG. 4 is executed by the operational design domain decision apparatus 1, when the determination unit 276 does not determine that the automatic driving system 3 is in the operational design domain in the flowchart in FIG. 3, that is, when the automatic driving system 3 is out of the operational design domain.

As shown in FIG. 4, the required value calculation unit 274 of the operational design domain decision apparatus 1, as a subtraction process (S30), performs a subtraction from the upper limit speed of the vehicle 2 set in the required detection distance calculation process (S16) in FIG. 3. The required value calculation unit 274 changes the upper limit speed to a speed resulting from decreasing the upper limit speed by a predetermined speed.

Subsequently, as a sign determination process (S32), the required value calculation unit 274 determines whether the upper limit speed is a positive value.

When the required value calculation unit 274 determines in the sign determination process (S32) that the upper limit speed is a positive value (S32: YES), the required value calculation unit 274 calculates the required detection distance again, as a recalculation process (S34). The calculation technique is the same as the calculation technique in the required detection distance calculation process (S16).

Subsequently, as a distance determination process (S36), the required value calculation unit 274 determines whether the detectable distance is equal to or more than the required detection distance. When the required value calculation unit 274 determines that the detectable distance is less than the required detection distance (S36: NO), the required value calculation unit 274 makes the process transition to the subtraction process (S30). Until the required value calculation unit 274 determines in the distance determination process (S36) that the detectable distance is equal to or more than the required detection distance, the required value calculation unit 274 executes the subtraction process (S30), the sign determination process (S32) and the recalculation process (S34) repeatedly.

When the required value calculation unit 274 determines in the distance determination process (S36) that the detectable distance is equal to or more than the required detection distance (S36: YES), the determination unit 276 determines that the automatic driving system 3 is in the operational design domain, as a decision process (S38). Subsequently, as a storage process (S40), the required value calculation unit 274 stores the upper limit speed after the subtraction (the changed upper limit speed used in the computation), in a storage device included in the ECU or the like. For example, the automatic driving ECU 24 refers to this information, and applies this information to the automatic driving control.

When the required value calculation unit 274 determines in the sign determination process (S32) that the upper limit speed is not a positive value (S32: NO) or when the storage process (S40) ends, the operational design domain decision apparatus 1 ends the flowchart shown in FIG. 4. For example, the operational design domain decision apparatus 1 executes the flowchart shown in FIG. 4 from the start, when the OFF operation of the operational design domain function by the driver of the vehicle 2 is not accepted.

Function Effect of First Embodiment

In the operational design domain decision apparatus 1 according to the first embodiment, from the map database 23 in which the restriction related to the vehicle speed and the position are associated with each other, the restriction related to the vehicle speed is acquired using the position of the vehicle 2. Then, based on the restriction related to the vehicle speed, the required detection distance is calculated. In this way, the operational design domain decision apparatus 1 can determine the required detection distance, on the premise that the moving object complies with the restriction related to the vehicle speed. Then, when the measured detectable distance is equal to or more than the required detection distance, it is determined that the automatic driving system 3 is in the operational design domain. In this way, the operational design domain decision apparatus 1 can appropriately determine the operational design domain of the automatic driving, using the required detection distance and the measured result.

The operational design domain decision apparatus 1 according to the first embodiment can calculate the maximum of the required detection distance, assuming that the vehicle 2 and the moving object travel at the highest speed in the restriction related to the vehicle speed acquired by the rule acquisition unit 273. Therefore, the operational design domain decision apparatus 1 can determine the operational design domain of the automatic driving, with the strictest condition.

When the determination unit 276 determines that the automatic driving system 3 is not in the operational design domain, the operational design domain decision apparatus 1 according to the first embodiment changes the upper limit speed of the vehicle 2 to a speed resulting from decreasing the upper limit speed by a predetermined speed, and thereby, can change the required detection distance such that the required detection distance is decreased. Therefore, the operational design domain decision apparatus 1 can narrow and determine the operational design domain of the automatic driving, by changing the condition of the speed of the vehicle 2 to a lower speed.

Second Embodiment

Configuration of Automatic Driving System

The configuration of an automatic driving system 3A according to a second embodiment is different from the configuration of the automatic driving system 3 according to the first embodiment, in some of the functions of the operational design domain decision apparatus, and is the same in the others. Hereinafter, repetitive descriptions will be omitted.

Figure 5:
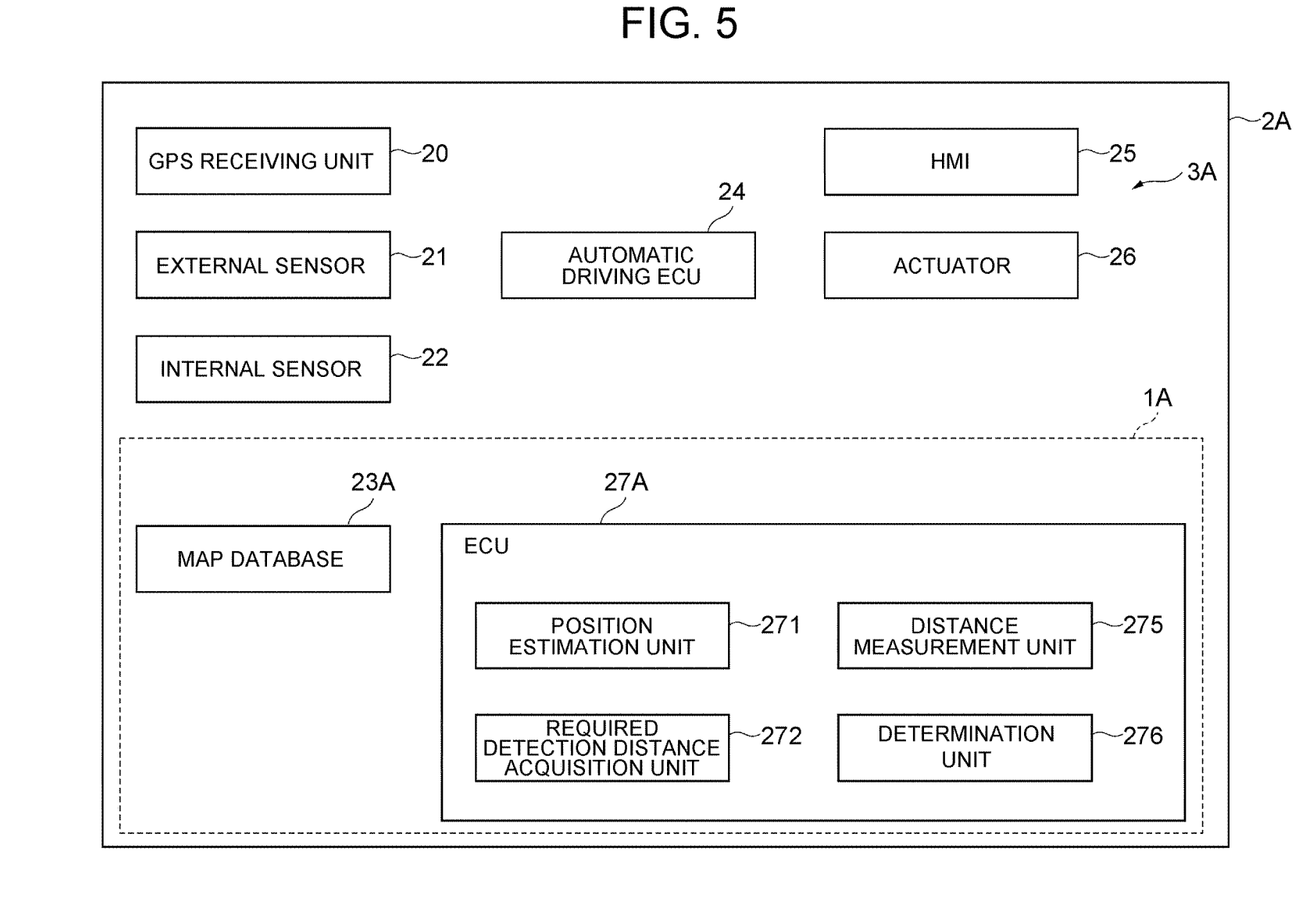
FIG. 5 is a block diagram showing an exemplary configuration of a vehicle including an operational design domain decision apparatus according to a second embodiment.

FIG. 5 is a block diagram showing an exemplary configuration of a vehicle 2A including an operational design domain decision apparatus 1A according to the second embodiment. As shown in FIG. 5, the automatic driving system 3A is different from the automatic driving system 3, in a map database 23A and an ECU 27A, and is the same in the others.

The map database 23A includes a required detection distance map in which the required detection distance and the position are associated, as the map information. That is, unlike the automatic driving system 3, the automatic driving system 3A does not need to compute the required detection distance. Therefore, the automatic driving system 3A does not include constituent elements (the traffic rule map, and the rule acquisition unit 273 and required value calculation unit 274 of the automatic driving system 3) related to the calculation of the required detection distance. The required detection distance included in the required detection distance map may be a value that is calculated as in the case of the automatic driving system 3, or may be a value that is determined by a third party. For example, the required detection distance may be a value that is standardized by an official organization such as a government. The other constituents and modified constituents of the map database 23A are the same as those of the map database 23.

As an example, the ECU 27A includes a position estimation unit 271, a required detection distance acquisition unit 272 (an exemplary acquisition unit), a distance measurement unit 275, and a determination unit 276. The position estimation unit 271, the distance measurement unit 275, and the determination unit 276 are the same as those of the automatic driving system 3.

The required detection distance acquisition unit 272 acquires the required detection distance, based on the position of the vehicle 2A estimated by the position estimation unit 271 and the map database 23A.

Operation of Operational Design Domain Decision Apparatus

Figure 6:
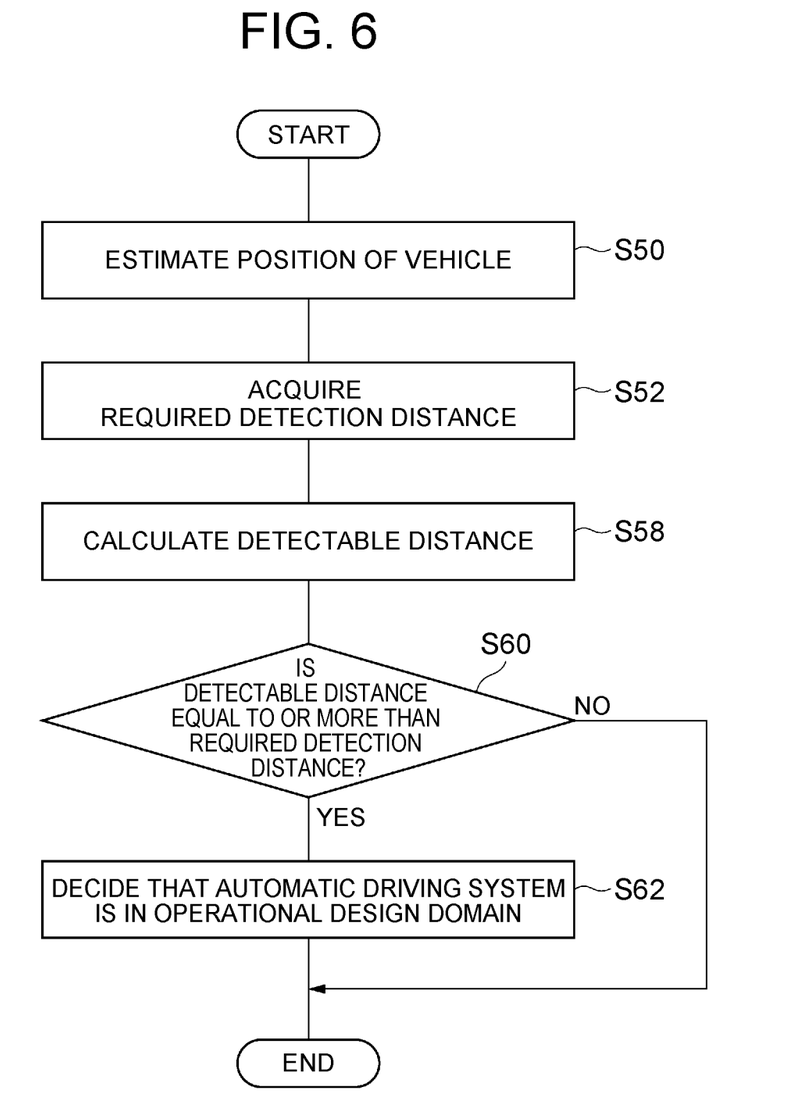
FIG. 6 is a diagram for describing an exemplary required distance calculation process.

In the following, an exemplary operational design domain decision method will be disclosed. FIG. 6 is a flowchart showing an exemplary operational design domain decision process. The flowchart in FIG. 6 is executed by the operational design domain decision apparatus 1A, for example, at the timing when the ON operation of the operational design domain decision function by the driver of the vehicle 2A is accepted.

A position estimation process (S50) in FIG. 6 is the same as the position estimation process (S10) in FIG. 3. Subsequently, as a required detection distance acquisition process (S52), the required detection distance acquisition unit 272 of the operational design domain decision apparatus 1A acquires the required detection distance corresponding to the position of the vehicle 2A, based on the position of the vehicle 2A estimated in the position estimation process (S50) and the required detection distance map of the map database 23A.

A detectable distance calculation process (S58), determination process (S60) and decision process (S62) that are subsequently performed are the same as the detectable distance calculation process (S18), determination process (S20) and decision process (S22) in FIG. 3. For example, the operational design domain decision apparatus 1A executes the flowchart shown in FIG. 6 from the start, when the OFF operation of the operational design domain decision function by the driver of the vehicle 2A is not accepted.

Function Effect of Second Embodiment

In the operational design domain decision apparatus 1A according to the second embodiment, from the map database 23A in which the required detection distance and the position are associated with each other, the required detection distance is acquired using the position of the vehicle 2A. Then, when the measured detectable distance is equal to or more than the required detection distance, it is determined that the automatic driving system 3A is in the operational design domain. In this way, the operational design domain decision apparatus 1A can appropriately determine the operational design domain of the automatic driving, using the required detection distance and the measured result.

The above-described embodiments can be carried out in a variety of modes in which various modifications and improvements are made based on the knowledge of a person skilled in the art.

For example, the calculation technique for the required detection distance by the required value calculation unit 274 is not limited to the content described in the first embodiment, and various modifications can be made. For example, it may be assumed that the vehicle 2 and the other vehicle 5 travel by uniform linear motion, or it may be assumed that the vehicle 2 and the other vehicle 5 travel by uniform accelerated motion.

In the first embodiment, the flowchart shown in FIG. 5 does not have to be executed.

What is claimed is:
1. An operational design domain decision apparatus comprising:

a traffic map database in which a restriction related to a vehicle speed and a position corresponding to the restriction are associated with each other; and an electronic control unit configured to:
- estimate a vehicle position of a vehicle;
- acquire the restriction from the traffic map database based on the vehicle position;
- calculate, based on the restriction, a required detection distance at which it is necessary for an object detection sensor equipped in the vehicle to have detected a moving object for execution of a predetermined automatic driving of the vehicle, the object detection sensor being configured to detect the moving object;
- create a required detection distance map in which the vehicle position and the required detection distance are associated with each other, a domain of the required detection distance map database being included in a domain of the traffic map database;
- calculate a detectable distance based on a detection result of the object detection sensor, the detectable distance being a distance within which the moving object is detectable by the object detection sensor;
- determine that an automatic driving system executing the predetermined automatic driving of the vehicle is in the operational design domain, when the detectable distance is equal to or more than the required detection distance; and
- execute the predetermined automatic driving based on a result of a decision whether the automatic driving system is in the operational design domain, the operational design domain being a domain in which the automatic driving system operates as designed.

2. The operational design domain decision apparatus according to claim 1, wherein the electronic control unit is configured to calculate the required detection distance, by assuming that the vehicle and the moving object travel at a highest speed within the restriction.

3. The operational design domain decision apparatus according to claim 2, wherein the electronic control unit is configured to re-calculate, in a case where the electronic control unit determines that the automatic driving system is not in the operational design domain, the required detection distance after the electronic control unit decreases an upper limit speed of the vehicle.

4. The operational design domain decision apparatus according to claim 1, wherein the moving object is an object traveling on a road on which the vehicle travels.

5. The operational design domain decision apparatus according to claim 1, wherein the electronic control unit is configured to calculate the required detection distance, by calculating, based on the restriction, a first required detection distance and a second required detection distance, and selecting one of the first required detection distance and the second required detection distance.

6. An operational design domain decision apparatus comprising:
- a required detection distance map database in which a required detection distance and a position corresponding to the required detection distance are associated with each other, the required detection distance being a distance at which it is necessary for an object detection sensor equipped in the vehicle to have detected a moving object for execution of a predetermined automatic driving of a vehicle, the object detection sensor being configured to detect the moving object, a domain of the required detection distance map database being included in a domain of a traffic map database; and
- an electronic control unit configured to:
  - estimate a vehicle position of the vehicle;
  - acquire the required detection distance from the required detection distance map database based on the vehicle position;
  - calculate a detectable distance based on a detection result of the object detection sensor, the detectable distance being a distance within which the moving object is detectable by the object detection sensor;
  - determine that an automatic driving system executing the predetermined automatic driving of the vehicle is in the operational design domain, when the detectable distance is equal to or more than the required detection distance; and
  - execute the predetermined automatic driving based on a result of a decision whether the automatic driving system is in the operational design domain, the operational design domain being a domain in which the automatic driving system operates as designed.

7. The operational design domain decision apparatus according to claim 6, wherein the moving object is an object traveling on a road on which the vehicle travels.

8. The operational design domain decision apparatus according to claim 2, wherein the electronic control unit is configured to calculate the required detection distance by correcting the restriction in consideration of a computing time of the automatic driving system.

* * * * *